US009221420B2

(12) United States Patent
Laubacher et al.

(10) Patent No.: US 9,221,420 B2
(45) Date of Patent: Dec. 29, 2015

(54) AIRBAG INFLATION SYSTEMS AND METHODS

(71) Applicant: Autoliv ASP, Inc., Ogden, UT (US)

(72) Inventors: Brian A. Laubacher, Pleasant View, UT (US); Christopher K. Fischer, Layton, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 116 days.

(21) Appl. No.: 14/077,357

(22) Filed: Nov. 12, 2013

(65) Prior Publication Data

US 2015/0128799 A1    May 14, 2015

(51) Int. Cl.
*B01D 45/12* (2006.01)
*B60R 21/261* (2011.01)
*B60R 21/26* (2011.01)

(52) U.S. Cl.
CPC ............... *B60R 21/26* (2013.01); *B60R 21/261* (2013.01); *B01D 45/12* (2013.01); *B60R 2021/2612* (2013.01)

(58) Field of Classification Search
CPC ........ B01D 50/00; B01D 45/08; B23P 11/00; B60R 21/26
USPC ......... 55/385.3, 444, 445, 446, 486; 280/736, 280/737, 738, 739, 740, 741, 742; 422/167; 29/428, 164, 167
See application file for complete search history.

(56) References Cited

U.S. PATENT DOCUMENTS

| 4,084,839 | A | 4/1978 | Takagi et al. | |
|---|---|---|---|---|
| 5,184,846 | A | 2/1993 | Goetz | |
| 5,335,940 | A | 8/1994 | Cuevas | |
| 5,660,606 | A | 8/1997 | Adamini | |
| 7,516,983 | B2 * | 4/2009 | Suehiro et al. | 280/741 |
| 7,905,516 | B2 | 3/2011 | Bostick et al. | |
| 8,142,534 | B2 * | 3/2012 | Whang et al. | 55/385.3 |
| 8,333,154 | B2 | 12/2012 | Fukuyama et al. | |
| 2007/0095035 | A1 * | 5/2007 | Quioc | 55/462 |
| 2012/0326423 | A1 * | 12/2012 | Hoffman | 280/741 |

FOREIGN PATENT DOCUMENTS

JP        2012240552        12/2012

* cited by examiner

*Primary Examiner* — Duane Smith
*Assistant Examiner* — Minh-Chau Pham
(74) *Attorney, Agent, or Firm* — Madson IP, P.C.

(57) ABSTRACT

An airbag assembly may include an airbag and an inflator in fluid communication with the airbag. The inflator may have a gas source chamber containing a gas source and a centrifugal flow chamber into which the gas flows from the gas source chamber through a centrifugal flow barrier. As the gas moves through the centrifugal flow barrier, it may be urged to move along a pathway that encircles at least a part of a longitudinal axis of the inflator. The gas may then move toward the longitudinal axis to flow through an orifice of an inward flow barrier. this inward flow may occur at a velocity that is generally too large for entrained particulates. Thus, such particulates may remain in the centrifugal flow chamber. The gas may flow from the orifice into a plenum chamber that releases the gas to the airbag via a plurality of apertures.

20 Claims, 5 Drawing Sheets

AIRBAG INFLATION SYSTEMS AND METHODS

TECHNICAL FIELD

The present invention relates to automotive safety. More specifically, the present invention relates to airbag inflators that enhance the cost-effectiveness and performance of airbag systems.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

The inflator is a critical part of the airbag assembly because it supplies the inflation gas needed to inflate the airbag cushion. The performance of the inflator is a key to effective airbag deployment. The airbag needs to deploy rapidly to be in place before motion of the vehicle occupants, but if deployment is too rapid, the result may be that the inflated airbag is too hard, thus failing to effectively cushion the occupants. Additionally, if the gases produced by the inflator are excessively hot or entrain too much debris, damage to the airbag may result. Thus, the gas output duration, volume, purity, and temperature are all important factors in the performance of the airbag system.

Typically, inflators are compressed gas, pyrotechnic, or hybrid inflators. "Compressed gas" inflators contain gas under pressure, while "pyrotechnic" inflators contain a pyrotechnic gas generant that ignites to produce the gas. "Hybrid" inflators typically use both compressed gas and a pyrotechnic charge. Some inflators are "dual stage," meaning that they can receive two independent activation signals to enable production of a selectively variable quantity of inflation gas, and others have only a single stage. However, single stage inflators can have multiple timed events, such as the ignition of multiple separate pyrotechnic charges and/or the release of distinct volumes of compressed gas, that are all triggered by a single activation signal.

Inflators of all types are typically made from a wide variety of parts. Each inflator may contain a selection of chambers, diffusers, filters, frangible membranes, initiators, generants, baffles, and containers, attachment hardware, and other components. Each of these parts adds significantly to the cost of the inflator. Hence, the inflator typically makes up a large portion of the cost of an airbag assembly.

Additionally, a series of different manufacturing steps may be needed to manufacture each inflator. The quantity of steps involved not only further increases the cost of potential inflators, it also increases the likelihood of defects in material or workmanship in the finished inflator.

SUMMARY OF THE INVENTION

The various systems and methods of the present disclosure have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The present disclosure may have other benefits that are not specifically set forth herein.

To achieve the foregoing, and in accordance with the embodiments and broadly described herein, an inflator may be provided for an airbag system for protecting a vehicle occupant from injury through use of an airbag. The inflator may include an exterior wall within which a gas source chamber and a centrifugal flow chamber are defined wherein the exterior wall is shaped to define a longitudinal axis. A gas source may be contained within the gas source chamber such that, in response to receipt by the inflator of an activation signal, the gas source provides a gas. The inflator may further include a centrifugal flow barrier between the gas source chamber and the centrifugal flow chamber. The centrifugal flow barrier may include a centrifugal flow feature that, in response to passage of the gas through the centrifugal flow barrier, urges the gas to move along a pathway that at least partially encircles the longitudinal axis. The inflator may further include an inward flow barrier with an orifice proximate the longitudinal axis to release gas from the centrifugal flow chamber. An inward flow region may span a width of the centrifugal flow chamber adjacent to the inward flow barrier. The inward flow region may be substantially free of any structure that would block flow of the gas toward the longitudinal axis.

The exterior wall may have a generally tubular shape defining a circumferential boundary of the centrifugal flow chamber. The centrifugal flow feature may urge the gas to move along the pathway at a velocity that induces particulate matter entrained in the gas to impinge against the exterior wall.

A plenum chamber may be defined within the exterior wall. The inward flow barrier may be positioned between the centrifugal flow chamber and the plenum chamber. The inflator may further include an egress barrier with a plurality of apertures distributed about the longitudinal axis to release the gas from the plenum chamber generally radially. The orifice may be oriented substantially perpendicular to the longitudinal axis. The gas may flow generally parallel to the axis to enter the plenum chamber through the orifice.

The centrifugal flow barrier may include a generally tubular shape defining a circumferential boundary of the gas source chamber. The centrifugal flow barrier may have an opening positioned to receive gas flowing generally radially outward from the gas source. Alternatively, the centrifugal flow barrier may have a generally planar shape defining an end wall of the gas source chamber. The centrifugal flow barrier may have an opening positioned to receive gas flowing generally axially from the gas source.

The centrifugal flow barrier may have a first opening through which the gas flows to pass through the centrifugal flow barrier. The centrifugal flow feature may have a first deflector extending from a main body of the centrifugal flow barrier proximate the first opening such that the gas impinges against the first deflector before or after passage of the gas through the first opening. In response to such impingement, the first deflector may redirect the gas to flow along the pathway. The centrifugal flow barrier may further have a plurality of additional openings and a plurality of additional deflectors, each of which is proximate one of the plurality of additional openings. The first deflector and the additional deflectors may be distributed about the longitudinal axis to relatively evenly distribute gas flow through the centrifugal flow barrier about the longitudinal axis.

The exterior wall may have a first end and a second end. The longitudinal axis may extend from the first end to the second end. The gas source may be positioned proximate the first end and the orifice may be positioned proximate the second end. In response to passage of the gas through the centrifugal flow barrier, the centrifugal flow feature may urge the gas to move toward the second end along the pathway.

According to one method for filtering gas produced by an inflator for an airbag system, such a method may include initiating provision of a gas by a gas source contained within a gas source chamber of the inflator, releasing the gas from the gas source chamber and into a centrifugal flow chamber through a centrifugal flow barrier, in response to flow of the gas through the centrifugal flow chamber, urging the gas to move along a pathway that at least partially encircles a longitudinal axis of the inflator, urging the gas to flow toward the longitudinal axis within an inward flow region that spans a width of the centrifugal flow chamber, wherein the inward flow region is substantially free of any structure that would block flow of the gas toward the longitudinal axis, and releasing the gas from the centrifugal flow chamber through an orifice of an inward flow barrier adjacent to the inward flow region, wherein the orifice is proximate to the longitudinal axis.

The inflator may have an exterior wall within which the gas source chamber and the centrifugal flow chamber are defined. The exterior wall may have a generally tubular shape defining a circumferential boundary of the centrifugal flow chamber. In response to motion of the gas along the pathway, the method may further include inducing particulate matter entrained in the gas to impinge against the exterior wall.

Releasing the gas from the centrifugal flow chamber through the orifice may include releasing the gas into a plenum chamber. The method may further include releasing the gas from the plenum chamber through a plurality of apertures distributed about the longitudinal axis to release the gas from the plenum chamber generally radially. The orifice may be oriented substantially perpendicular to the longitudinal axis. Releasing the gas into the plenum chamber through the orifice may include urging the gas to flow generally parallel to the axis.

The centrifugal flow barrier may have a generally tubular shape defining a circumferential boundary of the gas source chamber. Releasing the gas from the gas source may include releasing the gas through an opening in the centrifugal flow barrier. The method may further include urging the gas to flow generally radially outward from the gas source to the opening of the centrifugal flow barrier. Alternatively, the centrifugal flow barrier may have a generally planar shape defining an end wall of the gas source chamber. Releasing the gas from the gas source may include releasing the gas through an opening in the centrifugal flow barrier. The method may further include urging the gas to flow generally axially from the gas source to the opening of the centrifugal flow barrier.

The centrifugal flow barrier may have a plurality of openings and a plurality of deflectors extending from a main body of the centrifugal flow barrier and distributed about the longitudinal axis. Each deflector of the deflectors may be positioned proximate an opening of the plurality of openings such that the gas impinges against the deflector before or after passage of the gas through the opening. Urging the gas to move along the pathway may include, in response to such impingement, redirecting the gas to flow along the pathway.

The inflator may have a first end and a second end. The longitudinal axis may extend from the first end to the second end. The gas source may be positioned proximate the first end and the orifice may be positioned proximate the second end. Urging the gas to move along the pathway may include urging the gas to move toward the second end.

In one implementation, an inflator for an airbag system for protecting a vehicle occupant from injury through use of an airbag may include an exterior wall within which a gas source chamber and a centrifugal flow chamber are defined. The exterior wall may be shaped to define a longitudinal axis extending from a first end of the exterior wall to a second end of the exterior wall. A gas source may be contained within the gas source chamber proximate the first end such that, in response to receipt by the inflator of an activation signal, the gas source provides a gas. A centrifugal flow barrier may be positioned between the gas source chamber and the centrifugal flow chamber such that, in response to passage of the gas through the centrifugal flow barrier, the gas is urged to move toward the second end along a pathway that at least partially encircles the longitudinal axis. The inflator may further include an inward flow barrier having an orifice proximate the longitudinal axis to release gas from the centrifugal flow chamber.

The inflator may further have a plenum chamber defined within the exterior wall. The inward flow barrier may be positioned between the centrifugal flow chamber and the plenum chamber. The orifice may be oriented substantially perpendicular to the longitudinal axis. The gas may flow generally parallel to the axis to enter the plenum chamber through the orifice. The inflator may further have an egress barrier with a plurality of apertures distributed about the longitudinal axis to release the gas from the plenum chamber generally radially.

The centrifugal flow barrier may have a plurality of openings and a plurality of deflectors extending from a main body of the centrifugal flow barrier and distributed about the longitudinal axis. Each deflector of the deflectors may be positioned proximate an opening of the plurality of openings such that the gas impinges against the deflector before or after passage of the gas through the opening. In response to such impingement, the deflector redirects the gas to flow along the pathway.

The designs of the exemplary embodiments disclosed herein create a circumferential flow sufficient to filter out undesirable particles by centrifugal acceleration. Simply adding some flow vanes, however, does not necessarily assure that particles will be effectively eliminated. The circumferential flow velocities should be sufficiently high, and that can be accomplished by maintaining proper flow area ratios. Such proper ratios are a function of likely particle size, swirl velocity, gas density, drag coefficient, and centrifugal forces. As these factors vary based upon size and shape of the inflator, the type of inflation gas used, and the size of the likely impurities, a person of skill in the art, armed with this disclosure can determine the proper flow area ratios to effectively eliminate particles from the inflation gas.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments are disclosed and will become more fully apparent from the following description and appended claims, taken in conjunction with the accompanying drawings. Understanding that these drawings depict only exemplary embodiments and are, therefore, not to be consid

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus, system, and method of the present disclosure, as represented in FIGS. 1 through 5, is not intended to limit the scope of the invention, as claimed, but is merely representative of exemplary embodiments.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid that exits that is present in or contacting one feature is able to pass into or otherwise contact the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
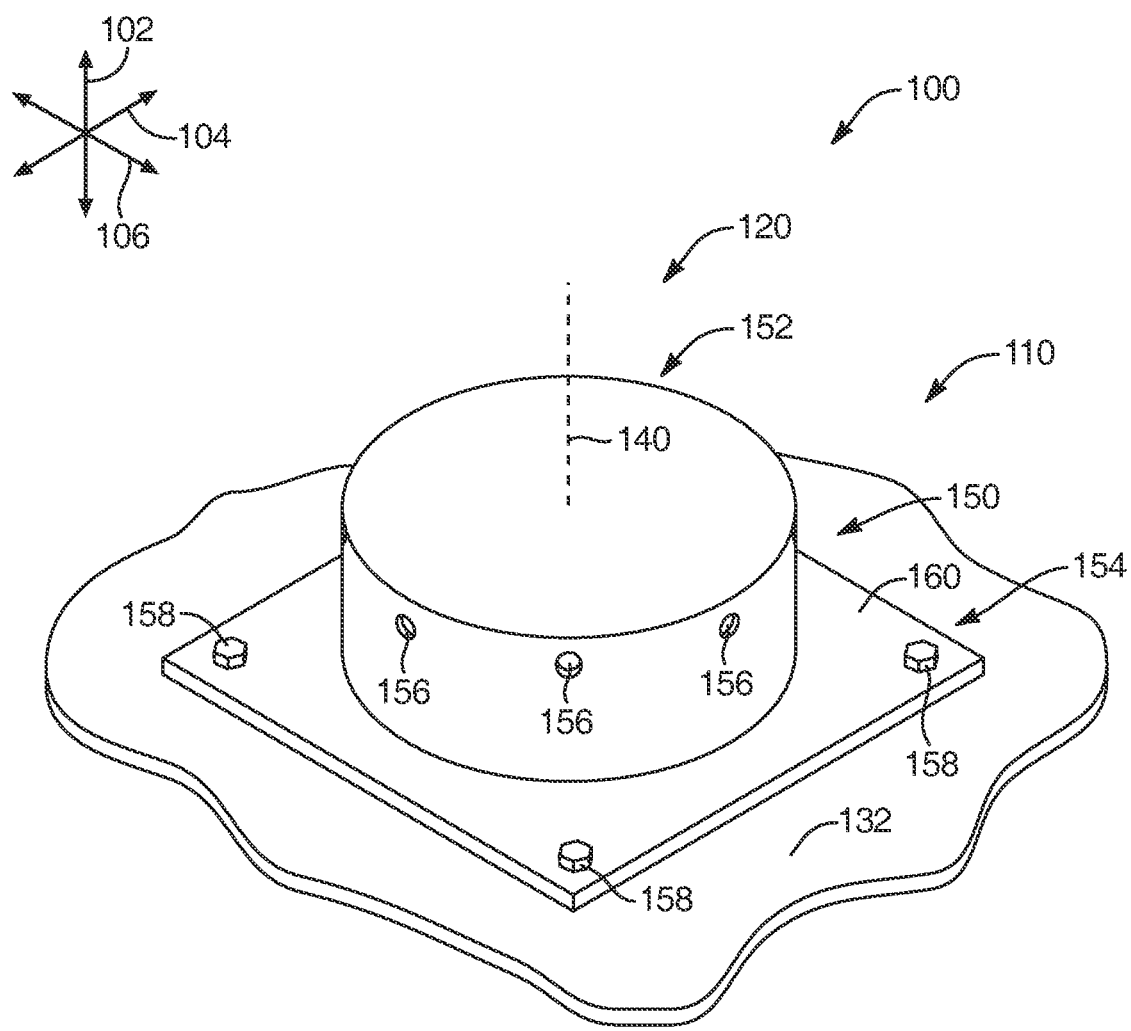
- FIG. 1 is a perspective view of an airbag assembly according to one embodiment of this disclosure.

Referring to FIG. 1, a perspective view illustrates an airbag system 100 that may be used to protect the occupants of a vehicle from injury during a collision. The airbag system 100 may be of any known type, including but not limited to driver's side airbags, passenger's side airbags, side airbags, inflatable curtain airbags, and knee airbags. The airbag system 100 may have a longitudinal direction 102, a lateral direction 104, and a transverse direction 106, all of which are orthogonal to each other.

The airbag system 100 may include an airbag 110 and an inflator 120. The airbag 110 may have a cushion (not shown) that inflates to receive and cushion impact from one or more vehicle occupants, and a mounting portion 132 securable to the vehicle. The airbag 110 may generally be formed from a flexible material such as a woven fabric, a thin polymer sheet, or the like. The airbag 110 may include multiple layers, which may be attached together via one-piece weaving, ultrasonic welding, RF welding, stitching, adhesive bonding, or a variety of other methods known in the art.

The inflator 120 may have a generally cylindrical shape with a longitudinal axis 140 oriented generally along the longitudinal direction 102. The inflator 120 may have a length along the longitudinal direction 102 that is much less than its width along the lateral direction 104 and the transverse direction 106. The inflator 120 may have an exterior wall 150 that includes a first end cap 152 and a second end cap 154. The first end cap 152 may have a plurality of apertures 156 that release inflation gas into the interior of the airbag 110 in response to receipt of an activation signal indicative of a collision, impending collision, or other sudden acceleration or deceleration event.

As shown, the apertures 156 may be disposed generally radially to expel gas outward, for example, within a plane defined by the lateral direction 104 and the transverse direction 106. This orientation of the apertures 156 may make the inflator 120 "thrust neutral," which relates to the fact that reaction forces induced by gases expelled from each of the apertures 156 may be generally counteracted by opposing reaction forces induced by gases expelled from the aperture 156 facing the opposite direction. Thrust neutral gas provision may simplify the mounting hardware (not shown) used to install the inflator 120 in the vehicle, since the mounting hardware need not resist large thrust forces on the inflator during deployment.

The airbag system 100 may also have mounting components that facilitate attachment of the inflator 120 and the mounting portion 132 to the vehicle. The mounting components may take the form of fasteners 158 that are secured, for example, to a mounting flange 160 of the second end cap 154, which may have holes 162 (visible in FIG. 2) that receive the fasteners 158.

The configuration illustrated in FIG. 1 may be particularly suited to a frontal impact airbag mounted in the steering wheel to protect the driver of the vehicle. However, in use with the other airbag types set forth above, an inflator and airbag may be configured much differently from those shown in FIG. 1. For example, an inflator may have an elongated shape with a length greater than its width. Apertures need not be located or patterned as illustrated; rather apertures may be positioned at one or both ends of the inflator and/or at any location between them, and may be oriented to expel gas radially, axially (i.e., longitudinally), or any combination thereof. Those of skill in the art will recognize that the inventive principles set forth herein may be used with a wide variety of inflator types.

Figure 2:
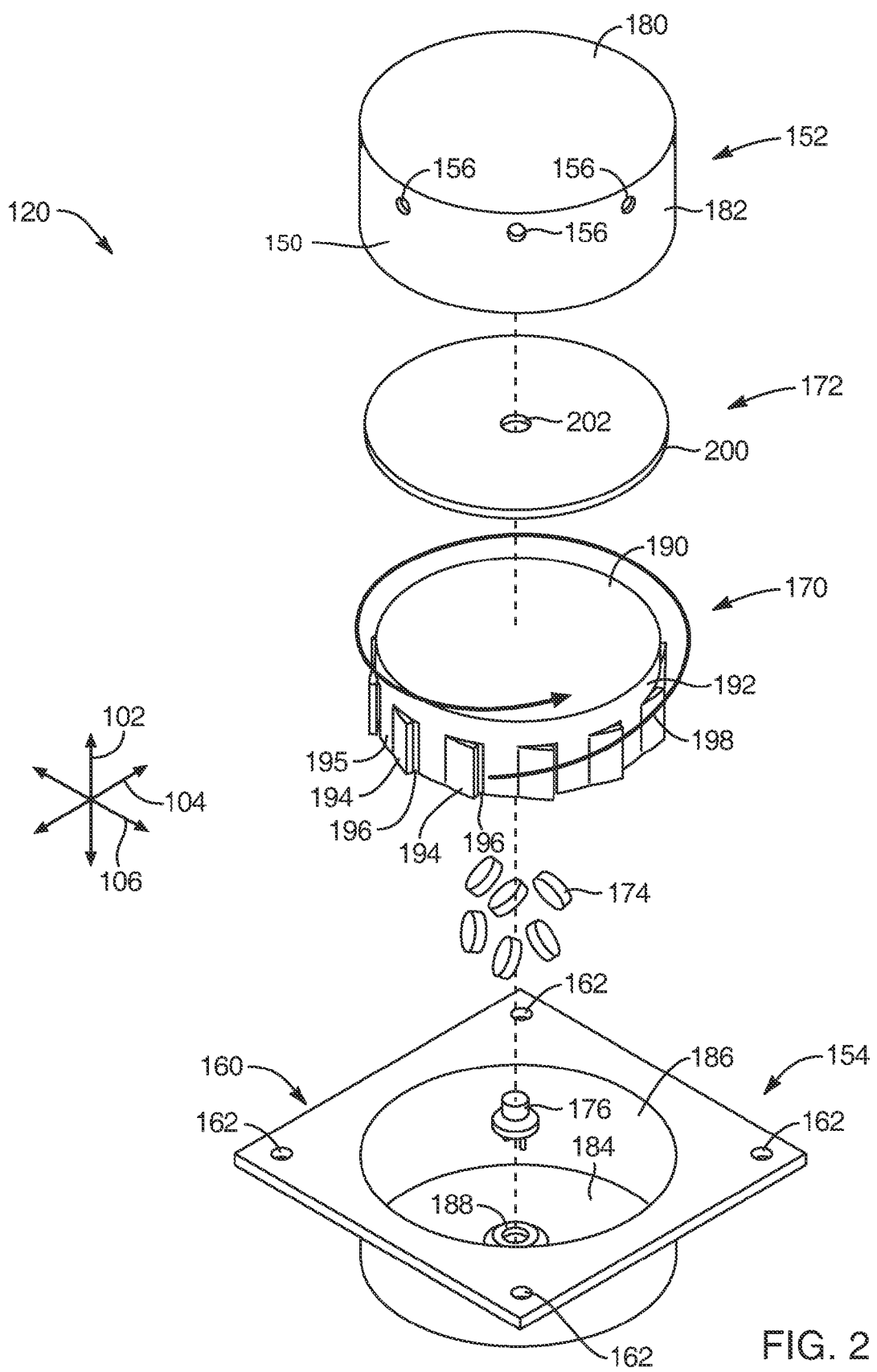
FIG. 2 is an exploded, perspective view of the inflator of the airbag assembly of FIG. 1.

Referring to FIG. 2, an exploded, perspective view illustrates the inflator 120 of the airbag system 100 of FIG. 1. As shown, the inflator 120 may have a centrifugal flow barrier 170, an inward flow barrier 172, generant 174, and an initiator 176 that are generally contained within the exterior wall 150. The first end cap 152 and the second end cap 154 may be secured together to define the exterior wall 150.

The first end cap 152, the second end cap 154, the centrifugal flow barrier 170, the inward flow barrier 172, and the initiator 176 may all be assembled in a generally coaxial manner. The generant 174 is shown loose, but may be encapsulated within a sealed or unsealed housing (not shown), if desired. The centrifugal flow barrier 170 may cooperate with the second end cap 154 to define a gas source chamber 210

Figure 3:
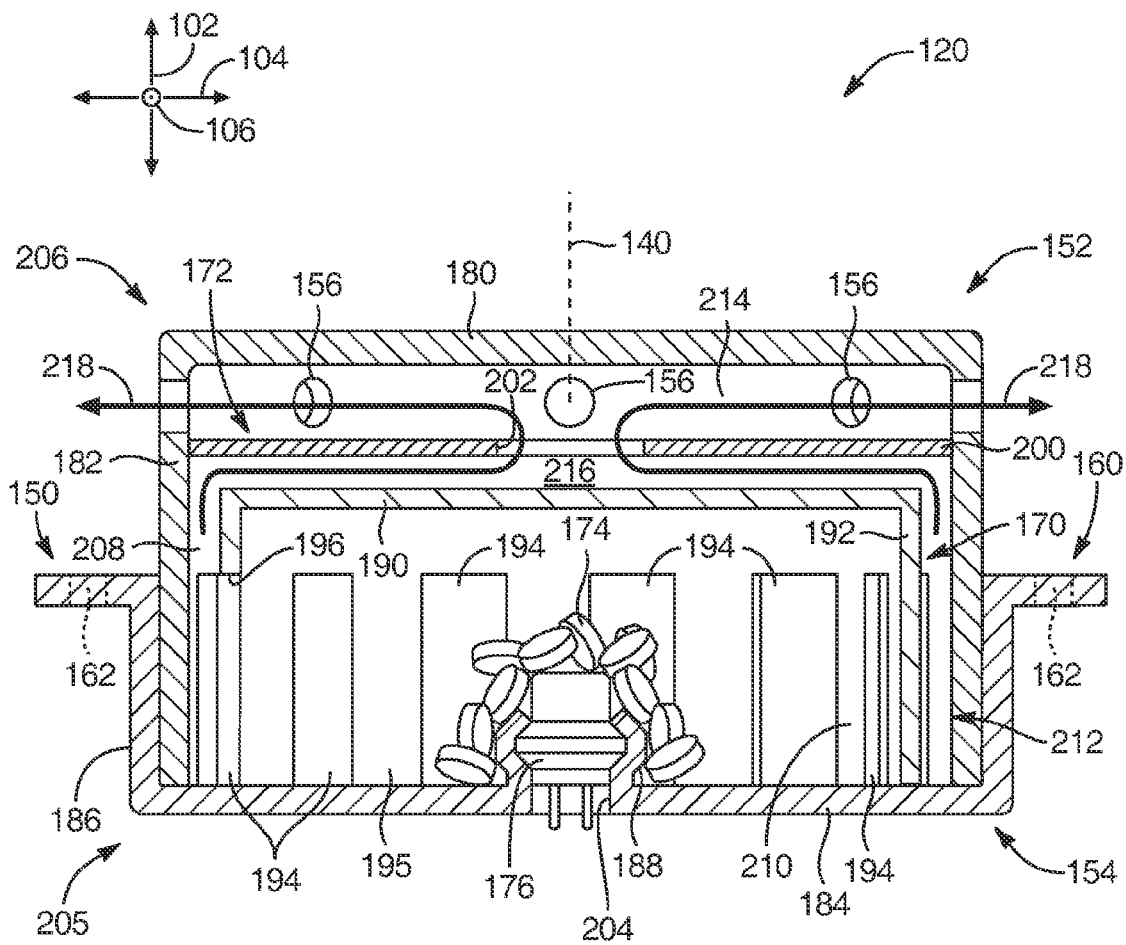
FIG. 3 is a side elevation section view of the inflator of the airbag assembly of FIG. 1 in a fully assembled state.

(shown in FIG. 3). The inward flow barrier 172 may cooperate with the centrifugal flow barrier 170 and the first end cap 152 to define a centrifugal flow chamber 212 (shown in FIG. 3). The inward flow barrier 172 may cooperate with the first end cap 152 to define a plenum chamber 214 (shown in FIG. 3). As noted, these various chambers are not shown in FIG. 2, but are shown and described subsequently with reference to FIG. 3.

Further to FIG. 2, the first end cap 152 may have an end plate 180 with a generally discoid shape and a circumferential wall 182 extending along the longitudinal direction 102 from the end plate 180, with a generally tubular shape. The apertures 156 may be spaced about the circumference of the circumferential wall 182. The second end cap 154 may also have an end plate 184 with a generally discoid shape and a circumferential wall 186 extending along the longitudinal direction 102 from the end plate 184. A retention feature 188 may be formed on the end plate 184 to receive the initiator 176. The retention feature 188 may be a boss, socket, clip, press fit assembly, or any other mechanism known in the art for retaining an initiator in an inflator.

The centrifugal flow barrier 170 may also have an end plate 190 with a generally discoid shape and a circumferential wall 192 extending along the longitudinal direction 102 from the end plate 190. A plurality of centrifugal flow features may be formed in the centrifugal flow barrier 170 to redirect gas flowing through the centrifugal flow barrier 170 such that the gas flows along a pathway 198 that at least partially encircles the longitudinal axis 140.

A pathway that at least partially encircles a longitudinal axis is a pathway that moves through at least some significant sectorial portion of a circle, helix, near-circle, near-helix, or a similar two-dimensional or three-dimensional shape centered on a longitudinal axis. Thus, by way of example and not limitation, a pathway that extends along a 45° arc centered on a longitudinal axis is one that at least partially encircles the longitudinal axis. The pathway 198 is only one example and defines a generally helical shape as shown.

A wide variety of centrifugal flow features may be used to accomplish such gas flow. A "centrifugal flow feature" may be any feature that induces gas to flow along at least part of a circular or helical pathway. Centrifugal flow features may include a wide variety of deflectors, vanes, nozzles, baffles, and the like.

In the embodiment shown in FIG. 2, the centrifugal flow barrier 170 may have centrifugal flow features in the form of deflectors 194 that extend outward from a main body 195 of the circumferential wall 192 of the centrifugal flow barrier 170 to leave openings 196. Each of the deflectors 194 may extend along a straight path, or may have some curvature to more efficiently direct gases exiting the interior of the centrifugal flow barrier 170. Each of the deflectors 194 may be positioned proximate to, and immediately outward of, one of the openings 196 so that gas flowing out of the centrifugal flow barrier 170 through the opening 196 impinges against the deflector 194 and, by virtue of the angulation and/or curvature of the deflector 194, is directed to flow generally tangentially relative to the circumferential wall 192. The deflectors 194 may be distributed relatively evenly about the circumference of the circumferential wall 192 to provide a relatively even distribution of gas outflow through the circumferential wall 192.

In alternative embodiments (not shown), centrifugal flow features may be positioned upstream of the corresponding openings so that the gas flow is redirected prior to passage through the opening. Yet further, in other alternative embodiments (not shown), centrifugal flow features may have wide variety of shapes and sizes. More than one centrifugal flow feature need not be provided; in alternative embodiments (not shown), only one such feature may be used.

The inward flow barrier 172 may be generally discoid in shape, and may have a peripheral region 200 and an orifice 202 centered with and perpendicular to the longitudinal axis 140. The position of the orifice 202 may cause the gas within the centrifugal flow chamber 212 to flow generally inward toward the orifice 202. In this application, "inward flow" relates to gas flowing generally toward a center or central axis such as the longitudinal axis 140 of the inflator 120. Inward flow does not require flow along a radial line from the center or axis. Thus, swirling gases that are moving in successively smaller circles are flowing inward, while swirling gases moving in successively larger circles are flowing outward.

The first end cap 152, the second end cap 154, the centrifugal flow barrier 170, the inward flow barrier 172, the generant 174, and the initiator 176 may be manufactured generally through the use of known processes. According to one example, the first end cap 152, the second end cap 154, the centrifugal flow barrier 170, and the inward flow barrier 172 may each be stamped from sheet metal. Each of these parts may alternatively be forged, bent, extruded, rolled, machined, or made from separate parts that are subsequently secured together. Multiple manufacturing steps may be needed to obtain the final configurations of the first end cap 152, the second end cap 154, the centrifugal flow barrier 170, and the inward flow barrier 172.

The deflectors 194 and the openings 196 may be formed in a variety of ways. According to one example, the deflectors 194 and the openings 196 may be formed synchronously in the circumferential wall 192 by punching, bending, or otherwise severing the deflectors 194 from the circumferential wall 192 on two sides, with a third side at the edge of the circumferential wall 192, leaving only the fourth side secured to the circumferential wall 192. The fourth side of each deflector 194 may define an angled fold with the circumferential wall 192, or may instead define more gradual bend.

Referring to FIG. 3, a side elevation, section view illustrates the inflator 120 of the airbag system 100 of FIG. 1 in a fully assembled state. According to one assembly method, the initiator 176 may first be inserted into the retention feature 188 and retained therein via crimping, fastening, or any other suitable process. A socket 204 may exist on the exterior of the end plate 184 to provide an interface whereby the initiator 176 can be electrically connected to a plug or other electrical interface (not shown). The generant 174 may be positioned proximate the retention feature 188 and the initiator 176. Although the generant 174 is illustrated in loose form in FIG. 3, the generant 174 may be contained and/or sealed in some manner if desired. In the alternative, a compressed gas container or a container having a combination of compressed gas and pyrotechnic generants may be used to provide inflation gas.

Once the initiator 176 and the generant 174 are in place, the centrifugal flow barrier 170 may be secured to the end plate 184 of the second end cap 154, for example, via inertial welding, laser welding, or any other known attachment method. The inward flow barrier 172 may be secured to the circumferential wall 182 of the first end cap 152 through any of the methods indicated above. Then, the corresponding end of the circumferential wall 182 of the first end cap 152 may be inserted into the circumferential wall 186 of the second end cap 154 and secured to the end plate 184 and/or to the circumferential wall 186 via press fitting, laser welding, inertial welding, or any other method.

The inflator 120 may have a first end 205 and a second end 206. The initiator 176 and the generant 174 may generally be proximate the first end 205, and the aperture 156 may be proximate the second end 206. The longitudinal axis 140 may extend generally from the first end 205 to the second end 206.

Upon assembly, a gas source chamber 210 may exist within the space bounded by the interior surfaces of the centrifugal flow barrier 170 and the end plate 184 of the second end cap 154. The gas source chamber 210 contains the generant 174 (or an alternative gas source), and is therefore the origin of inflation gases that will be used to inflate the airbag 110.

A centrifugal flow chamber 212 may exist within the space bounded by the exterior surface of the centrifugal flow barrier 170 and the interior surfaces of the end plate 184, the circumferential wall 182, and the inward flow barrier 172. The centrifugal flow chamber 212 may have a generally annular region 208 between the circumferential wall 192 of the centrifugal flow barrier 170 and the circumferential wall 182 of the first end cap 152. The centrifugal flow chamber 212 may also have an inward flow region 216 between the end plate 190 of the centrifugal flow barrier 170 and the inward flow barrier 172. The inward flow region 216 may have a generally discoid shape. The interior surface of the circumferential wall 182 may generally define a circumferential boundary of the centrifugal flow chamber 212.

A plenum chamber 214 may exist within the space bounded by the inward flow barrier 172 and the interior surfaces of the end plate 180 and the circumferential wall 182 of the first end cap 152. The first end cap 152 may provide an egress barrier for the inflator 120 because the gas must flow through the apertures 156 in the first end cap 152 to escape the inflator 120.

Centrifugal filtration occurs when impurities in the gas stream, such as uncombusted pyrotechnic material, combustion byproducts, debris from the initiator 176, and the like, are unable to remain entrained in the flow of gas moving through the inflator 120, and thus remain in the inflator 120. The phrase "centrifugal force" refers to the continuous outward acceleration, and thence outward force, required for an object to move about an axis. In the case of a gas stream, the inward centripetal acceleration of the gas and resulting drag force on particulate matter entrained in the gas flow may be provided by the gas itself. If the inward drag forces on the particulates are less than or equal to the centrifugal forces acting on the particles, then the particulate cannot further move radially outward with the gas and becomes effectively filtered. Thus, centrifugal filtration may occur to remove such particulate matter from a gas stream moving along a circular, helical, or similar pathway. The designs of the exemplary embodiments disclosed herein create a circumferential flow sufficient to filter out undesirable particles by centrifugal acceleration. Simply adding some flow vanes, however, does not necessarily assure that particles will be effectively eliminated. The circumferential flow velocities should be sufficiently high, and that can be accomplished by maintaining proper flow area ratios. Such proper ratios are a function of likely particle size, swirl velocity, gas density, drag coefficient, and centrifugal forces. As these factors vary based upon the size and shape of the inflator, the type of inflation gas used, and the size of the likely impurities, a person of skill in the art, armed with this disclosure, can determine the proper flow area ratios to effectively eliminate particles from the inflation gas.

The inflator 120 may rely solely on centrifugal filtration. Thus, the inflator 120 may not contain any type of filtration medium, such as a woven or compacted wire medium that is present in many known inflator types. The omission of such structure may enable the inflator 120 to be more rapidly and cost-effectively manufactured within a relatively more compact space. Filtering gas centrifugally may also provide a superior degree of filtration, reducing the quantity of impurities ejected from the inflator 120. The manner in which centrifugal filtration is achieved by the inflator 120 will be described in greater detail below.

In operation, a control system (not shown) may sense an impact, a rollover condition, or an impending impact or rollover condition. The control system may transmit an activation signal to the initiator 176. In response, the initiator 176 may ignite, triggering ignition of the generant 174. The generant 174 may rapidly produce inflation gas as it burns. The gas may be driven outward generally radially toward the circumferential wall 192 of the centrifugal flow barrier 170.

The gas may pass through the openings 196 in the circumferential wall 192 and impinge against the deflectors 194, which urge the gas to flow generally tangentially relative to the circumferential wall 192, thus flowing along the pathway 198 illustrated in FIG. 2. The gas may further impinge against the interior surface of the circumferential wall 182 of the first end cap 152, which impingement may further induce the gas to flow along the pathway 198 (i.e., in this illustrated exemplary embodiment, counterclockwise when viewed from the top along the longitudinal axis 140 of the inflator 120).

Although the deflectors 194 may be replaced with other types of centrifugal flow features as set forth above, omitting the deflectors 194 may fail to cause the desired centrifugal flow because rather than flowing uniformly counterclockwise, the gas may form eddy currents as some portions flow clockwise and some flow counterclockwise. Thus, the deflectors 194 may help to expedite and lend uniformity to the desired centrifugal gas flow. The speed at which the gas flows may be proportional to the effectiveness of centrifugal particle filtration.

The relatively narrow confines of the annular region 208 may cause gas flowing along the pathway 198 to move at very high speed. The continuous inward acceleration needed to keep particulate matter entrained in the gas stream may be excessive given the weight of the particulate matter; thus, some particulate matter may fall out of entrainment within the annular region 208 and remain in the annular region 208 as the gas moves into the inward flow region 216. Additionally or alternatively, some particulates may impinge against the interior surface of the circumferential wall 182 of the first end cap 152; such impingement may also slow them down, causing them to drop out of entrainment in the gas stream. Some such particulates may remain within the annular region 208 as the gas moves into the inward flow region 216 from the annular region 208.

Flow of gas from the annular region 208 to the inward flow region 216, into the plenum chamber 214, and out of the inflator is represented by the pathways 218, which may represent a continuation of the pathway 198 illustrated in FIG. 2. More precisely, gas exiting the gas source chamber 210 may move first along the pathway 198, and then along the pathways 218 to exit the inflator 120. Although the pathways 218 shown in FIG. 3 are unable to illustrate continued motion of the gases about the longitudinal axis 140, such motion may continue to occur within the inward flow region 216.

Once within the inward flow region 216, the gas may need to flow rapidly inward, i.e., toward the longitudinal axis 140, in order to exit the inward flow region 216 through the orifice 202. Such inward flow may intensify the inward acceleration required to enable particulate matter to match the inward motion of the gas to remain entrained in the gas flow, particularly when coupled with continued motion about the longitudinal axis 140. The gas may effectively move in a circular or helical pattern with a shrinking radius as the gas flows toward the orifice 202. Thus, additional particulate matter may drop out of entrainment at this stage. The inward flow region 216 may advantageously be free of any structure that would block gas flow toward the longitudinal axis 140. Such structures, if present, may slow the flow of gas toward the longitudinal axis 140, thereby disrupting the desired centrifugal filtration.

Due to the centrifugal filtration described above, impurities in the gas stream may generally remain within the inward flow region 216 rather than passing into the plenum chamber 214. After passage of the gas through the orifice 202, the purified gas may flow into the plenum chamber 214 and out of the inflator 120 through the apertures 156. The gas may flow generally radially outward from the longitudinal axis 140 as they exit the plenum chamber 214 through the apertures 156. As mentioned previously, gas flow through the apertures 156 may be substantially thrust-neutral due to the relatively even distribution of the apertures 156 about the longitudinal axis 140.

Advantageously, the gas may generally flow from the first end 205 to the second end 206. Gas flow through the inflator 120 may operate independently of any part requiring gas to flow in the opposite direction, i.e., toward the first end 205. This may provide a number of benefits, including more efficient gas egress from the inflator 120 and less disruption to the centrifugal flow of the gas. If the gas were to move in two directions (i.e., toward the first end 205 and toward the second end 206) within a single chamber, such motion may disrupt the centrifugal filtration effect by causing eddy currents or other irregularities in the flow of gas about the longitudinal axis 140. Gas motion that flows in only one direction along the longitudinal axis 140, i.e., toward the second end 206, may provide for smoother, faster gas flow about the longitudinal axis 140, thereby providing superior centrifugal filtration.

In the embodiment of FIGS. 1-3, the centrifugal flow barrier 170, or more specifically, the circumferential wall 192 of the centrifugal flow barrier 170 through which the gas flows, may have a generally tubular shape. In alternative embodiments, a variety of different shapes may be used for a centrifugal flow barrier according to the invention. In one alternative embodiment, a centrifugal flow barrier may have a generally planar shape, as will be shown and described in FIGS. 4-5.

Figure 4:
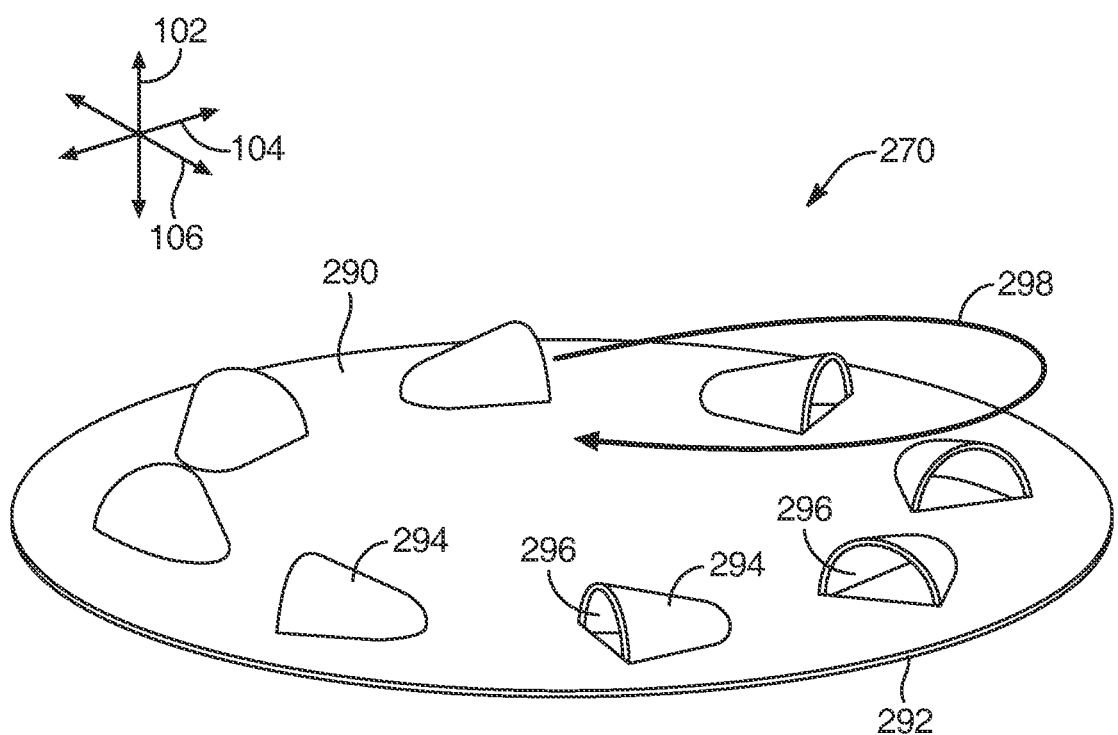
FIG. 4 is a perspective view of a centrifugal flow barrier of an inflator according to another embodiment.

Referring to FIG. 4, a perspective illustrates a centrifugal flow barrier 270 of an inflator 220 (shown in FIG. 5) according to another embodiment of the invention. The centrifugal flow barrier 270 may be used in place of the centrifugal flow barrier 170 of the inflator 120.

As shown, the centrifugal flow barrier 270 may have a generally discoid, planar shape with a main body in the form of an end plate 290, and a peripheral region 292. A plurality of deflectors 294 and openings 296 may be formed in the end plate 290. Each of the deflectors 294 may have a opening 296 that corresponds to it. Each deflector 294 may protrude from the end plate 290 such that gas passing through the centrifugal flow barrier 270 though the opening 296 that corresponds to it will generally impinge on the deflector 294. In response to this impingement, the gas may be redirected to flow along a pathway 298 that encircles the longitudinal axis 140 of the inflator 220. Like the pathway 198, the pathway 298 may have a generally helical shape as the gas moves along the longitudinal axis 140 generally from a first end 305 to a second end 306 (see FIG. 5) of the inflator 220.

Figure 5:
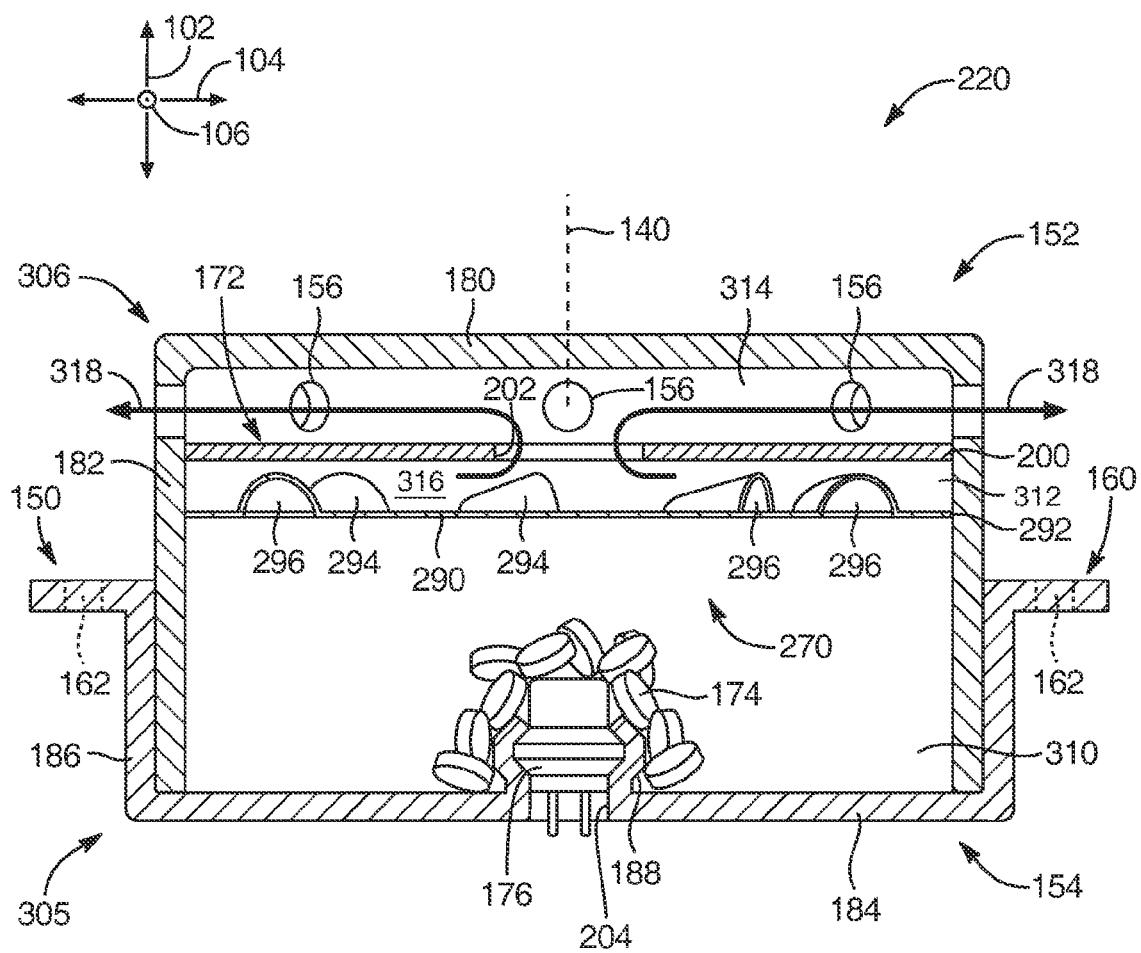
FIG. 5 is a side elevation, section view of an inflator having the centrifugal flow barrier of FIG. 4.

Referring to FIG. 5, a side elevation, section view illustrates an inflator 220 having the centrifugal flow barrier 270 of FIG. 4. The inflator 220 may have a exterior wall 150 formed of a first end cap 152 and a second end cap 154, an inward flow barrier 172, generant 174, and an initiator 176 like those of the inflator 120 of the previous embodiment. Thus, assembly of the inflator 220 may be similar to that described above, except that in place of securing the centrifugal flow barrier 170 to the end plate 184 of the second end cap 154, the peripheral region 292 of the centrifugal flow barrier 270 may be secured to the interior of the circumferential wall 182 of the first end cap 152 in a manner similar to that of the inward flow barrier 172.

After the inflator 220 has been fully assembled, the end plate 184 of the second end cap 154, the circumferential wall 182 of the first end cap 152, and the centrifugal flow barrier 270 may cooperate to define a gas source chamber 310. The circumferential wall 182 of the first end cap 152, the inward flow barrier 172, and the centrifugal flow barrier 270 may cooperate to define a circumferential flow chamber 312. The circumferential wall 182 and the end plate 180 of the first end cap 152 may cooperate with the inward flow barrier 172 to define a plenum chamber 314.

An inward flow region 316 may exist within the circumferential flow chamber 312. Since the circumferential flow chamber 312 has no annular region like the annular region 208, the inward flow region 316 may comprise the entirety of the circumferential flow chamber 312. Thus, inward flow of the gas toward the longitudinal axis 140 may commence as soon as the gas enters the circumferential flow chamber 312.

In operation, a control system (not shown) may sense an impact, a rollover condition, or an impending impact or rollover condition. The control system may transmit an activation signal to the initiator 176. In response, the initiator 176 may ignite, triggering ignition of the generant 174. The generant 174 may rapidly produce inflation gas as it burns. The gas may be driven generally axially (i.e., parallel to the longitudinal axis 140) toward the end plate 290 of the centrifugal flow barrier 270.

The gas may pass through the openings 296 in the end plate 290 and impinge against the deflectors 294, which urge the gas to flow along the pathway 298 illustrated in FIG. 4. The gas may further impinge against the interior surface of the circumferential wall 182 of the first end cap 152, which impingement may further induce the gas to flow along the pathway 298 (i.e., in this exemplary embodiment, clockwise when viewed from the top along the longitudinal axis 140 of the inflator 220).

Flow of gas from the inward flow region 316 into the plenum chamber 314 and out of the inflator is represented by the pathways 318, which may represent a continuation of the pathway 298 illustrated in FIG. 4. More precisely, gas exiting the gas source chamber 310 may move first along the pathway 298, and then along the pathways 318 to exit the inflator 220. Although the pathways 318 shown in FIG. 5 are unable to illustrate continued motion of the gases about the longitudinal axis 140, such motion may continue to occur within the inward flow region 316.

Within the inward flow region 316, the gas may need to flow rapidly inward, i.e., toward the longitudinal axis 140, in order to exit the inward flow region 316 through the orifice 202. Such inward flow may intensify the inward acceleration required to enable particulate matter to match the inward motion of the gas to remain entrained in the gas flow, particularly when coupled with continued motion about the longitudinal axis 140. The gas may effectively move in a circular or helical pattern with a shrinking radius as the gas flows toward the orifice 202. Thus, particulate matter may drop out of entrainment within the inward flow region 316. Like the inward flow region 216, the inward flow region 316 may advantageously be free of any structure that would block gas flow toward the longitudinal axis 140.

Due to the centrifugal filtration accomplished by sufficiently high circumferential flow velocities as described herein above, impurities in the gas stream may be removed from the gas and generally remain within the inward flow region 316 rather than passing into the plenum chamber 314. After passage of the gas through the orifice 202, the purified gas may flow into the plenum chamber 314 and out of the inflator 220 through the apertures 156. The gas may flow generally radially outward from the longitudinal axis 140 as they exit the plenum chamber 314 through the apertures 156. As in the previous embodiment, gas flow through the apertures 156 may be substantially thrust-neutral due to the relatively even distribution of the apertures 156 about the longitudinal axis 140.

As in the inflator 120, the gas may advantageously flow generally from the first end 305 to the second end 306. Gas flow through the inflator 220 may operate independently of any part requiring gas to flow in the opposite direction, i.e., toward the first end 305. As also described in connection with the inflator 120, filtration may be carried out within the inflator 220 without the need for traditional filtration media, thus saving manufacturing time and expense. The inflator 220 may also provide filtration superior to that of traditional filtration media.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention. Embodiments of the invention in which an exclusive property or privilege is claimed are defined as follows.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An inflator for an airbag system for protecting a vehicle occupant from injury through use of an airbag, the inflator comprising:
   an exterior wall housing a gas source chamber and a centrifugal flow chamber, the exterior wall having a longitudinal axis and a generally tubular shape that defines a circumferential boundary of the centrifugal flow chamber;
   a gas source contained within the gas source chamber, wherein, in response to receipt by the inflator of an activation signal, the gas source provides a gas;
   a centrifugal flow barrier disposed between the gas source chamber and the centrifugal flow chamber, the centrifugal flow barrier comprises a centrifugal flow feature that urges the gas passing through the centrifugal flow barrier to move in an arc centered on the longitudinal axis;
   an inward flow barrier comprising an orifice generally perpendicular to and proximate the longitudinal axis, the inward flow barrier permits the gas to flow inward to release from the centrifugal flow chamber; and
   an inward flow region that spans a width of the centrifugal flow chamber adjacent to the inward flow barrier, the inward flow region is substantially free of any structure that would block inward flow of the gas toward the longitudinal axis to release through the orifice.

2. The inflator of claim 1, wherein the centrifugal flow feature urges the gas to move at a velocity that induces particulate matter entrained in the gas to impinge against the exterior wall.

3. The inflator of claim 1, further comprising a plenum chamber housed within the exterior wall, the inward flow barrier is positioned between the centrifugal flow chamber and the plenum chamber, a portion of the exterior wall comprises an egress barrier having a plurality of apertures distributed about the egress barrier spaced radially from the longitudinal axis, the plurality of apertures release the gas from the plenum chamber generally radially.

4. The inflator of claim 3, wherein the gas flows generally parallel to the longitudinal axis to enter the plenum chamber through the orifice.

5. The inflator of claim 1, wherein at least a portion of the centrifugal flow barrier comprises a generally tubular shape defining a circumferential boundary of the gas source chamber, the centrifugal flow feature receives gas flowing generally radially outward from the gas source.

6. The inflator of claim 1, wherein the centrifugal flow barrier comprises a generally planar shape defining an end wall of the gas source chamber, wherein the centrifugal flow feature receives gas flowing generally axially from the gas source.

7. The inflator of claim 1, wherein the centrifugal flow barrier comprises a first opening through which the gas flows to pass through the centrifugal flow barrier, wherein the centrifugal flow feature comprises a first deflector extending from a main body of the centrifugal flow barrier proximate the first opening such that the gas impinges against the first deflector and, in response to such impingement, the first deflector redirects the gas to flow in the arc centered on the longitudinal axis.

8. The inflator of claim 7, wherein the centrifugal flow barrier further comprises a plurality of additional openings and a plurality of additional deflectors, each of which is proximate one of the plurality of additional openings, wherein the first deflector and the additional deflectors are distributed to relatively evenly distribute gas flow through the centrifugal flow barrier about the longitudinal axis.

9. The inflator of claim 1, wherein the exterior wall comprises a first end and a second end, wherein the longitudinal axis extends from the first end to the second end, wherein the gas source is positioned proximate the first end and the orifice is positioned proximate the second end, wherein, in response to passage of the gas through the centrifugal flow barrier, the centrifugal flow feature urges the gas to move toward the second end.

10. A method for filtering gas produced by an inflator for an airbag system, the method comprising:
   initiating provision of a gas by a gas source contained within a gas source chamber of the inflator;
   releasing the gas from the gas source chamber and into a centrifugal flow chamber through a centrifugal flow barrier;
   in response to flow of the gas through the centrifugal flow chamber, urging the gas to move in an arc centered on a longitudinal axis of the inflator;
   urging the gas to flow inward toward the longitudinal axis within an inward flow region that spans a width of the centrifugal flow chamber, the inward flow region is substantially free of any structure that would block flow of the gas toward the longitudinal axis; and
   releasing the gas from the centrifugal flow chamber through an orifice in an inward flow barrier adjacent to the inward flow region, wherein the orifice is generally perpendicular to and proximate the longitudinal axis.

11. The method of claim 10, wherein the inflator comprises an exterior wall having a generally tubular shape defining a circumferential boundary of the centrifugal flow chamber, the method further comprising:
   inducing particulate matter entrained in the gas to impinge against the exterior wall.

12. The method of claim 11, wherein releasing the gas from the centrifugal flow chamber through the orifice comprises releasing the gas into a plenum chamber, the method further comprising:
   releasing the gas from the plenum chamber through a plurality of apertures in the exterior wall generally radially.

13. The method of claim 12, wherein releasing the gas into the plenum chamber through the orifice comprises urging the gas to flow generally parallel to the axis.

14. The method of claim 10, wherein the centrifugal flow barrier comprises a generally tubular shape defining a circumferential boundary of the gas source chamber, wherein releasing the gas from the gas source comprises releasing the gas through an opening in the centrifugal flow barrier, the method further comprising:
   urging the gas to flow generally radially outward from the gas source to the opening of the centrifugal flow barrier.

15. The method of claim 10, wherein the centrifugal flow barrier comprises a generally planar shape defining an end wall of the gas source chamber, wherein releasing the gas from the gas source comprises releasing the gas through an opening in the centrifugal flow barrier, the method further comprising:
   urging the gas to flow generally axially from the gas source to the opening of the centrifugal flow barrier.

16. The method of claim 10, wherein the centrifugal flow barrier comprises a plurality of openings and a plurality of deflectors extending from a main body of the centrifugal flow barrier and distributed about the longitudinal axis, wherein each deflector of the deflectors is positioned proximate an opening of the plurality of openings such that the gas impinges against the deflector and, in response to such impingement, redirecting the gas to flow into the arc centered on the longitudinal axis.

17. The method of claim 10, wherein the inflator comprises a first end and a second end, wherein the longitudinal axis extends from the first end to the second end, wherein the gas source is positioned proximate the first end and the orifice is positioned proximate the second end, wherein urging the gas to move comprises urging the gas to move toward the second end.

18. An inflator for an airbag system for protecting a vehicle occupant from injury through use of an airbag, the inflator comprising:
   an exterior wall housing a gas source chamber and a centrifugal flow chamber, the exterior wall having a first end wall, a second end wall, and a longitudinal axis extending through the first end wall and the second end wall;
   a gas source contained within the gas source chamber proximate the first end wall, wherein, in response to receipt by the inflator of an activation signal, the gas source provides a gas;
   a centrifugal flow barrier between the gas source chamber and the centrifugal flow chamber, wherein, in response to passage of the gas through the centrifugal flow barrier, the gas is urged to move toward the second end wall and in an arc centered on the longitudinal axis; and
   an inward flow barrier urges the flow of gas inward and comprises an orifice generally perpendicular to and proximate the longitudinal axis, the orifice to release gas from the centrifugal flow chamber.

19. The inflator of claim 18, further comprising:
   a plenum chamber housed within the exterior wall, the inward flow barrier being disposed between the centrifugal flow chamber and the plenum chamber, wherein the gas flows generally parallel to the longitudinal axis to enter the plenum chamber through the orifice; and
   an egress barrier having a plurality of apertures distributed about the egress barrier spaced radially from the longitudinal axis, the plurality of apertures release the gas from the plenum chamber generally radially.

20. The inflator of claim 18, wherein the centrifugal flow barrier comprises a plurality of openings in and a plurality of deflectors extending from the centrifugal flow barrier, wherein each deflector of the plurality of deflectors is positioned proximate an opening of the plurality of openings such that the gas impinges against each deflector, each deflector redirects the gas to flow into the arc centered on the longitudinal axis.

* * * * *